United States Patent [19]
van Raalte

[11] Patent Number: 4,798,448
[45] Date of Patent: Jan. 17, 1989

[54] HIGH EFFICIENCY ILLUMINATION SYSTEM FOR DISPLAY DEVICES

[75] Inventor: John A. van Raalte, Princeton, N.J.

[73] Assignee: General Electric Company, Fairfield, Conn.

[21] Appl. No.: 156,060

[22] Filed: Feb. 16, 1988

[51] Int. Cl.⁴ .............................................. G02F 1/13
[52] U.S. Cl. .................... 350/345; 350/333; 350/339 F; 362/268; 362/297; 362/342; 362/346
[58] Field of Search ...................... 350/333, 339 F, 338, 350/345; 362/268, 290, 297, 300, 317, 325, 342, 346, 354

[56] References Cited

U.S. PATENT DOCUMENTS

| | | | |
|---|---|---|---|
| 3,734,598 | 5/1973 | Aiken | 350/338 |
| 3,891,309 | 6/1975 | Bonne | 350/338 |
| 4,241,392 | 12/1980 | Boone | 362/342 |
| 4,330,813 | 5/1982 | Deutsch | 362/244 |
| 4,379,621 | 4/1983 | Ikedo et al. | 350/392 |
| 4,456,336 | 6/1984 | Chung et al. | 350/338 |
| 4,591,233 | 5/1986 | Fergason | 350/334 |
| 4,606,611 | 8/1986 | Fergason | 350/334 |
| 4,706,173 | 11/1987 | Hamada et al. | 362/346 X |

Primary Examiner—Stanley D. Miller
Assistant Examiner—Richard F. Gallivan
Attorney, Agent, or Firm—E. M. Whitacre; D. H. Irlbeck; L. L. Hallacher

[57] ABSTRACT

An illumination system for a color display device includes means for separating the different polarizations of incoming light. One of the polarizations is rotated whereby the polarization of all the light directed toward the screen is the same. A lenticular lens array is used to focus light onto the cells of the picture elements. The three primary light colors are split so that the individual cells within the picture elements receive only the desired color of light.

18 Claims, 3 Drawing Sheets

HIGH EFFICIENCY ILLUMINATION SYSTEM FOR DISPLAY DEVICES

BACKGROUND

This invention relates generally to illumination systems for display devices and particularly to back illumination systems for color liquid crystal displays.

Color display devices are rapidly gaining popularity for visually displaying alphanumeric and graphic information. Additionally, industry is energetically pursuing the development of a color television display which is different from the standard color cathode ray tube. Liquid crystal display devices are at the forefront of these endeavors. The pixels of liquid crystal displays are composed of twisted nematic liquid crystal cells, and are arranged into a column and row matrix so that each pixel is associated with a particular row and column. The liquid crystal cells are individually addressed to actuate the cells to change their light transmitting characteristics, as needed by the particular display to be produced. Color displays are produced by associating a filter of a particular color with each liquid crystal cell so that each crystal cell will appear to transmit only one color of light. When the display is to be used for a color display, or color television, each pixel contains a triad of liquid crystal cells and each of the cells transmits either red, green or blue light. It is also possible to use pixels including four liquid crystal cells. In such a use the cells are arranged parallel to the axes of the screen and the pixels are square. The present invention is useful with all types of pixel configurations. The various other colors of the light spectrum are produced by properly combining the primary light colors. This technique is well known and is utilized in the CRT color picture tube art as well.

In liquid crystal displays, back illumination is frequently used to provide a bright, high-contrast display having a wide viewing angle; the back illumination must therefore be quite bright for the desired purposes.

In liquid crystal displays, the incoming light must be polarized and reasonably well collimated to make effective use of the liquid crystal electroptic effect and to produce a uniform display having acceptable contrast. A significant amount of light generated by the primary light source is usually lost in collimation. Also, a substantial percentage, typically more than 50%, of the incoming collimated light is lost to the polarizers. Additionally, because each of the liquid crystal cells within the pixels of the color display transmits only one color component of the light spectrum, approximately two thirds of the light transmitted by the polarizers is lost to the filters. Accordingly, 85%, or more, of the incoming collimated light to the display device is typically lost because of the inefficiencies of the polarizers and filters. Another small percentage of light is also lost to other inefficiencies of the display device, such as the panel area devoted to conductors and active circuit elements required to actuate the crystals. For these reasons, there is a need for a high efficiency illumination system for a display device which eliminates a substantial portion of the light losses occasioned by the utilization of polarizers and color filters. The present invention fulfills these needs.

SUMMARY

An illumination system for a display device having a screen composed of multi-celled pixels for producing the primary colors of light, and a light source for illuminating the screen includes means for separating incident light into separate components in accordance with the polarization of the incident light whereby the separate components have different polarizations, and for rotating one of the rays whereby all the pixel cells receive light having the same polarization. The system also includes means for focusing light onto the pixel cells. A means for splitting the focused light into the primary colors directs the primary colors of light onto individual pixel cells corresponding to the individual primary colors of light.

DETAILED DESCRIPTION

Figure 1:
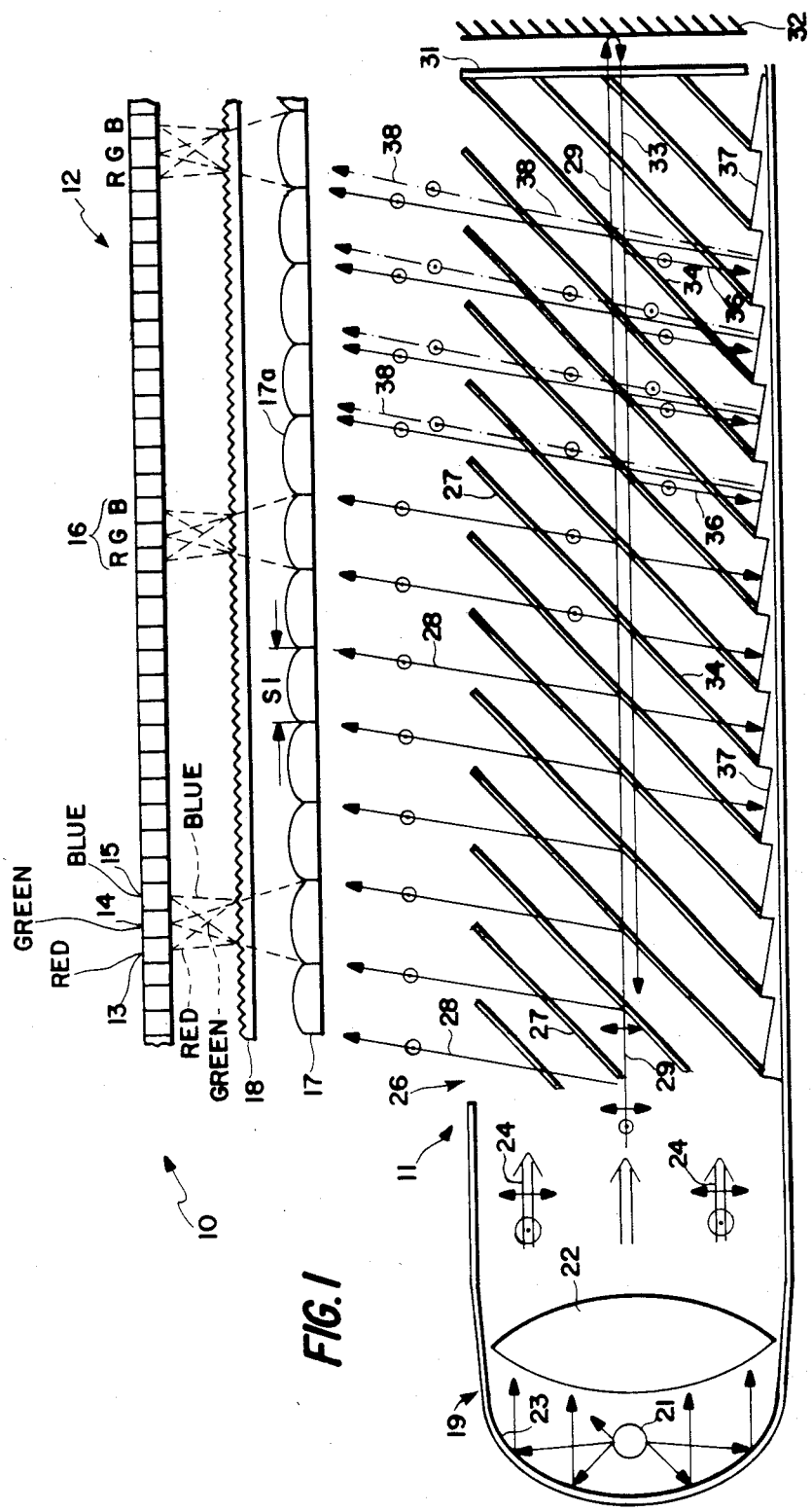
FIG. 1 is a first preferred embodiment.

FIG. 1 shows a major portion of a display device 10 incorporating a preferred embodiment of an efficient back illumination source 11. Structural details of the display device 10 which are not required for an understanding of the invention, and which are well known in the art, are omitted for simplicity. The display device 10 includes a matrix 12 of liquid crystal cells such as 13, 14 and 15 which individually transmit either red, green or blue light, as indicated by the R, G, B designations in the figure. The R, G, B cells are combined into triads 16, and each triad therefore can produce any color of light by selectively actuating the R, G, B cells. A means for focusing light onto the cells of the liquid crystal matrix 12 includes an array 17 of longitudinal lenticular lenses 17a which extend completely across one dimension of the screen of the display device 10, and which have a partially circular cross section. The plane of the lens array 17 is arranged substantially parallel to the plane of the liquid crystal matrix 12. The longitudinal axes of the lenticulations 17a are parallel to either the vertical or horizontal axis of the screen. A means for splitting light 18 is arranged between the lenticular lens array 17 and the matrix 12 of liquid crystal cells, the means for splitting light preferably is a diffraction grating. The lenticular lenses 17a have a span S1 and a focal length selected so that the lenses focus light onto a particular liquid crystal cell of each of the triads. As illustrated, this is selected to be the green cell and the red and blue cells lie on opposite sides of the green cell. In the prior art devices, the illuminating light is directed toward all three liquid crystal cells within each pixel triad so that all cells receive white light. This results in substantial inefficiency because each liquid crystal cell must be associated with a filter so that each cell within a pixel passes only one of the three primary colors of light. The invention overcomes this inefficiency. The diffraction grating 18 splits the white light received from the lenticular lenses 17a and bends the light so that the three primary light colors are directed to the individual liquid crystal cells and each liquid crystal cell receives only the color which is intended to be transmitted through the cell.

A light source 19 includes an illumination source 21, such as a lamp or fluorescent tube, a lens 22 and a reflector 23. The light source 19 can be any of many light sources available in the art and is designed to provide collimated light rays 24 which back illuminate the cells 13, 14 and 15 of the display device. The light rays are collimated but are unpolarized. The different polarizations of light emanated by the light source 19 are individually indicated by the small circles and double headed arrows shown on the various light rays throughout the figure. Thus, light rays marked with a double headed arrow are polarized in the plane of the drawing, while those marked with a small circle are polarized normal to the plane of the drawing. The collimated light rays 24 from the light source 19 are provided to a means for separating the incident light 26 in accordance with the two polarizations. Accordingly, one polarization is passed directly to the screen. The other polarization is rotated to the same polarization as the one passed directly to the screen and then is also passed to the screen. The means for separating light 26 includes a plurality of transparent sheets 27 which are arranged at Brewster's angle with respect to the light rays 24. The light rays 24 impact the reflective surfaces of the transparent sheets 27 and because the sheets are arranged at Brewster's angle a small percentage (typically 18% of one polarization and none of the orthogonal polarization) of the rays are reflected directly to the lenticular lens array 17, for example rays 28 are reflected toward the lens array 17. The rest of the incident light passes directly through the transparent sheet 27 as the rays 29 to impact the next of the transparent sheets 27 and the reflection, transmission process is repeated. All the rays 28 which are reflected by the surfaces of the sheets 27 have the same polarization, as indicated by the small circles in the rays 28. The rays 29 passing through the transparent sheets 27 have both polarizations. The light rays 29 continue through the light separating device 26 to a means for rotating light 31 which is arranged perpendicular to the light rays 29 at the end of the series of reflective sheets 27. The means for rotating light preferably is a quarter wave retardation plate. Light passing through the retardation plate 31 is reflected off a reflective surface 32 and reflected back through the quarter wave retardation plate 31 so that the polarization of the reflected rays 33 are rotated a full 90° to the same polarization as the rays 28, which are directly reflected toward the lenticular filter 17. The rays 33 which are received from the reflective surface 32 and the quarter wave retardation plate 31 impact the reflective surfaces 34 of the transparent sheets 27 and a percentage of the rays are reflected downwardly as the rays 36 to a plurality of mirrors 37, which are arranged at the complement of Brewster's angle. The rays 36 are reflected upwardly by the mirrors 37 toward the lenses 17, indicated as the rays 38, and all of the rays 28 and 38 traveling toward the lenticular lens 17 (and thus to the liquid crystal cells 13, 14 and 15) have the same polarization. The invention is highly desirable because all the light directed to the liquid crystals 13, 14 and 15 has the same polarization, thereby substantially decreasing the light losses occasioned by polarizers in prior art devices. Additionally, the individual liquid crystal cells 13, 14 and 15 receive only the color of light which is intended to be transmitted and the filter losses ordinarily associated with liquid crystal displays are substantially eliminated.

Figure 2:
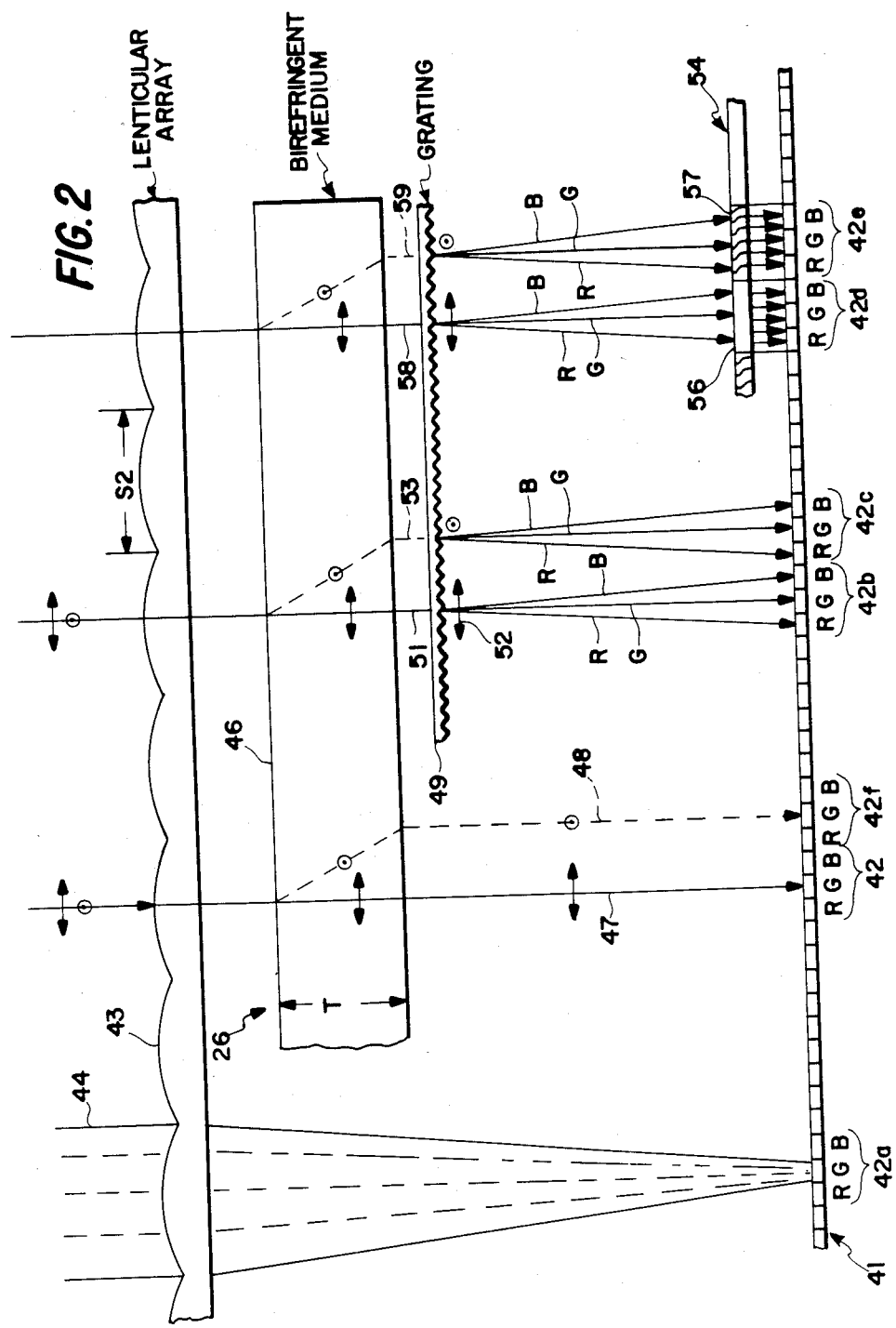
FIG. 2 is a second preferred embodiment.

FIG. 2 shows another preferred embodiment having an array 41 of liquid crystal cells arranged in triads 42 of RGB liquid crystal cells. The various light manipulating elements are broken away at selected points to simplify the understanding of the device. The plane of a lenticular lens array 43 is arranged parallel to the plane of a liquid crystal matrix 41, and the individual lenticulations within the lens array have a span S2 which is equal to twice the span of the triads 42. Incoming light rays 44 are focused onto the liquid crystal cells within the triads 42 by the lenticulations. The focal length of the lenticulations of the lens array 43 is selected to focus the light onto a single cell of each of the triads 42. In the absence of the other elements the incoming rays 44 are focused on the green cell, for instance, of the triad 42a and both polarizations of the light ray 44 are received by the liquid crystal cells.

In FIG. 2, the means for separating incident light includes a birefringent medium 46, for example a calcite sheet, which physically separates the two polarizations of light. The birefringent medium 46 has a thickness T which causes the two polarizations of light to be separated by the triad span S2/2 so that each of the green liquid crystal cells within adjacent triads receives focused light from the individual lenticulations of the lenticular array 43, as shown by the light rays 47 and 48. The rays 47 and 48 have different polarizations, as indicated by the small circle and double headed arrow. A diffraction grating 49 is arranged between the birefringent medium 46 and the liquid crystal cells of the matrix 41. Accordingly the three primary colors red, green and blue of the light ray 51 impact the R, G and B cells of the triad 42b. The polarization of the light ray 51 is parallel to the plane of the figure, as indicated by the double headed arrow 52. The polarization of the light ray 53 is normal to the plane of the figure and the R,.G and B rays are received by the respective R, G and B liquid crystal cells of the triad 42c. The means for rotating light 54 includes alternate clear sections 56 and half wave retardation sections 57. Accordingly, the light of the ray 58 having the polarization within the plane of the figure passes through the clear section 56a and the light rays are passed to the RGB crystal cells of the triad 42d unaffected. The light ray 59 is polarized normal to the plane of the figure, as indicated by the small circle and the RGB rays pass through the half wave retardation portion 57 which rotates the polarization of the RGB rays 90° to the polarization which is parallel to the plane of the figure. Accordingly, the cells in the triad 42e, and all of the liquid crystal cells within the matrix 41 receive the same polarization of light, as is required for the efficient operation of the display. In FIG. 2, the birefringent medium 46, the diffraction gradient 49 and the rotating element 54 are broken away for convenience of explanation. In a display device all of these elements span the complete area of the cell matrix 41.

Figure 3:
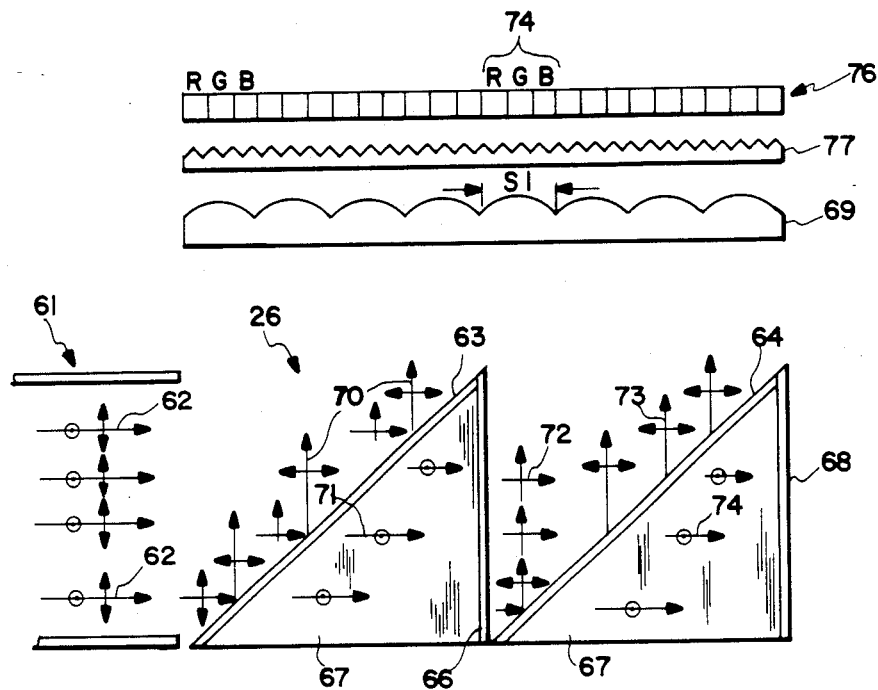
FIG. 3 is a third preferred embodiment.

The embodiment of FIG. 3 includes a light source 61 of collimated but unpolarized light rays 62. The means for separating the incident light includes dichroic polarizers 63 and 64 which are separated by a half wave retardation member 66. The dichroic polarizers are supported on transparent substrates 67 and a light absorption member 68 is arranged at the end of the light separating means. The dichroic polarizers 63 and 64 are arranged at Brewster's angle with respect to the path of the light rays 62. As is known to those skilled in the art, dichroic polarizers are stacks of materials with alternating high and low indices of refraction materials. The polarizers therefore act as a series of cascaded glass plates and light rays having one polarization, for example the rays 68 polarized parallel to the plane of the paper are reflected toward the lenticular lens 69. The rays 71 having the polarization perpendicular to the plane, of the paper pass directly through the dichroic surface 63 and half wavelength retardation plate so the rays 72 emanating from the rotator 66 also have the polarization parallel to the pane of the paper. Accordingly, the rays 72 contact the dichroic polarizer 64 and are reflected toward the lenticular array 69 as the rays 73. The reflected rays 73 and 68 have the same polarization. Very few rays, such as the rays 74 pass to the absorption member 68. The lenticulations within the lenticular array 69 have a span S1 which is substantially equal to the span of the triads 74 of RGB liquid crystal cells within the liquid crystal matrix 76. The diffraction grating 77 is arranged between the lenticular array 69 and the liquid crystal matrix 76 to split the three primary colors of light so that each color impacts a single liquid crystal cell in the same manner as the embodiment described with respect to FIG. 1 and FIG. 2.

In the FIG. 3 embodiment, only two of the dichroic polarizers are utilized and therefore the thickness of the light separator 26 is approximately half the linear dimension of the liquid crystal matrix 76 and, thus also half of the screen dimension of the display device. This embodiment, therefore, has substantial benefit in, for example, very small liquid crystal display devices which are used to project an image onto a larger screen for viewing purposes.

The lenticular arrays and the diffraction grating used in the embodiments of FIGS. 1, 2 and 3 can be inexpensively made by molded plastic. Additionally, illumination systems which are presently available in the art, can be used for the illumination sources shown in the various embodiments.

I claim:

1. An illumination system for a display device having a screen composed of multicelled pixels for producing the primary colors of light, and a light source for illuminating said screen, said illumination system comprising:
   means for separating incident light into separate components in accordance with the polarization of said incident light whereby the separate components have different polarizations, and for rotating one of said polarizations whereby all of said pixels receive light having the same polarization; and
   means for focusing light onto said pixels.

2. The illumination system of claim 1 wherein said means for focusing includes a plurality of lenticular lenses for individually focusing said light onto said triads of pixels.

3. The illumination system of claim 2 wherein said lenticular lenses are longitudinal lenses extending across one dimension of said screen and have a partially circular cross section, the width of said lenses being substantially equal to said pixels.

4. An illumination system for a display device having a screen composed of multicelled pixels for producing the primary colors of light, and a light source for illuminating said screen, said illumination system comprising:
   means for focusing light onto said pixels; and
   means for splitting said focused light into the primary colors and for directing the primary colors of light onto individual cells corresponding to the individual primary colors of light.

5. The illumination of claim 4 wherein said means for splitting is a diffraction grating.

6. An illumination system for a display device having a screen composed of multicelled pixels for producing the primary colors of light, and a light source for illuminating said screen, said illumination system comprising:
   means for separating incident light into separate components in accordance with the polarization of said incident light whereby the separate components have different polarizations, and for rotating one of said polarizations whereby all of said pixels receive light having the same polarization;
   means for focusing light onto said pixels; and
   means for splitting said focused light into the primary colors and for directing the primary colors of light onto individual cells corresponding to the individual primary colors of light.

7. The illumination system of claim 6 wherein said means for focusing includes a plurality of lenticular lenses for individually focusing said light onto said triads of pixels.

8. The illumination system of claim 7 wherein said means for splitting is a diffraction grating.

9. The illumination system of claim 8 wherein lenticular lenses are longitudinal lenses extending across one dimension of said screen and have a partially circular cross section, the width of said lenses being substantially equal to said pixels.

10. The illumination system of claim 9 wherein said means for separating incident light includes a plurality of surfaces arranged at Brewster's angle with respect to said incident light, and aligned to sequentially reflect at least a portion of one polarization of said light toward said screen and to pass the other portion of said light.

11. The illumination system of claim 10 wherein said surfaces are transparent sheets whereby a small percentage of one polarization of said light is reflected to said screen by each of said sheets, and a major portion of said light is transmitted to the subsequent one of said sheets.

12. The illumination system of claim 11 further including means for the polarization of rotating light received from the last of said sheets, and a reflective surface for reflecting light back through said means for rotating whereby return light from said means for rotating has the same polarization as the polarization of the light reflected to said screen by said sheets, and still further including means for reflecting said return light to said screen.

13. The illumination system of claim 12 wherein said means for reflecting return light includes a plurality of mirrors individually' associated with said sheets and arranged at the complement of Brewster's angle.

14. The illumination system of claim 10 wherein said means of incident light includes a plurality of dichroic polarizers for sequentially receiving light, and half-wave retardation means arranged between said dichroic polarizers whereby said dichroic polarizers reflect the same polarization of light toward said screen.

15. The illumination system of claim 14 wherein said dichroic polarizers are supported by transparent members.

16. The illumination system of claim 15 further including a light absorption member on the last of said reflecting members.

17. The illumination system of claim 9 wherein said means for separating incident light includes a birefringent medium arranged between said lenses and said diffraction grating.

18. The illumination system of claim 17 further including a light transmitting member having alternate clear and quarter-wave portions aligned with said pixels whereby all of said pixels receive light having the same polarization.

* * * * *

UNITED STATES PATENT AND TRADEMARK OFFICE
CERTIFICATE OF CORRECTION

PATENT NO. : 4,798,448

DATED : January 17, 1989

INVENTOR(S) : John A. van Raalte

It is certified that error appears in the above-identified patent and that said Letters Patent is hereby corrected as shown below:

Col. 4, line 68, after "plate" insert --66--
Col. 6, line 48, after "means" delete "of" and
                 insert --for separating--

Signed and Sealed this

Twentieth Day of February, 1990

*Attest:*

JEFFREY M. SAMUELS

*Attesting Officer*   Acting Commissioner of Patents and Trademarks